US007365275B2

(12) United States Patent
Iiduka et al.

(10) Patent No.: US 7,365,275 B2
(45) Date of Patent: Apr. 29, 2008

(54) ELECTROMAGNETIC-FORCE-BALANCING-TYPE ELECTRONIC BALANCE

(75) Inventors: Atushi Iiduka, Kyoto (JP); Kunio Shimauchi, Kyoto (JP); Nobuyuki Yoshikuwa, Kyoto (JP)

(73) Assignee: Shimadzu Corporation, Kyoto-Fu (JP)

( * ) Notice: Subject to any disclaimer, the term of this patent is extended or adjusted under 35 U.S.C. 154(b) by 16 days.

(21) Appl. No.: 11/528,357

(22) Filed: Sep. 28, 2006

(65) Prior Publication Data
US 2007/0075810 A1 Apr. 5, 2007

(30) Foreign Application Priority Data
Sep. 30, 2005 (JP) ............................. 2005-287335

(51) Int. Cl.
G01G 7/02 (2006.01)

(52) U.S. Cl. .................. 177/210 EM; 177/DIG. 5; 335/296

(58) Field of Classification Search ........ 177/210 EM, 177/DIG. 5; 335/296
See application file for complete search history.

(56) References Cited
U.S. PATENT DOCUMENTS 3,688,854 A * 9/1972 Strobel ...................... 177/164
3,786,678 A * 1/1974 Kunz ....................... 73/862.61
3,786,883 A * 1/1974 Kunz .......................... 177/164
3,786,884 A * 1/1974 Allenspach ............. 177/210 R
4,034,819 A * 7/1977 Akers et al. ............. 177/210 C
4,091,886 A * 5/1978 Knothe et al. ......... 177/210 EM
4,168,756 A * 9/1979 Enzmann et al. ...... 177/210 EM

FOREIGN PATENT DOCUMENTS
JP 10142032 A * 5/1998

* cited by examiner

Primary Examiner—Ramon M. Barrera
(74) Attorney, Agent, or Firm—Sughrue Mion, LLC

(57) ABSTRACT

Disclosed is an electromagnetic-force-balancing-type electronic balance having a magnetic circuit which includes a yoke 4, a first permanent magnet 1, a pole piece 3, a second permanent magnet 2 and a cover 5. A connection member 7 made of a magnetic material is disposed in an air-gap region included in the magnetic circuit. The connection member 7 may be disposed between the second permanent magnet 2 and the cover 5 or between the cover 5 and the yoke 4 to facilitate assembling operations. Alternatively, first and second gap-defining members 8, 9 made of a non-magnetic material may be disposed, respectively, between the first permanent magnet 1 and the yoke 4 and between the second permanent magnet 2 and the cover 5, to provide symmetric properties in magnetic sub-circuits so as to counteract an imbalance in hysteresis characteristic. The present invention can suppress adverse influences of a magnetic resistance caused by an air gap existing in the magnetic circuit of the electronic balance.

7 Claims, 5 Drawing Sheets

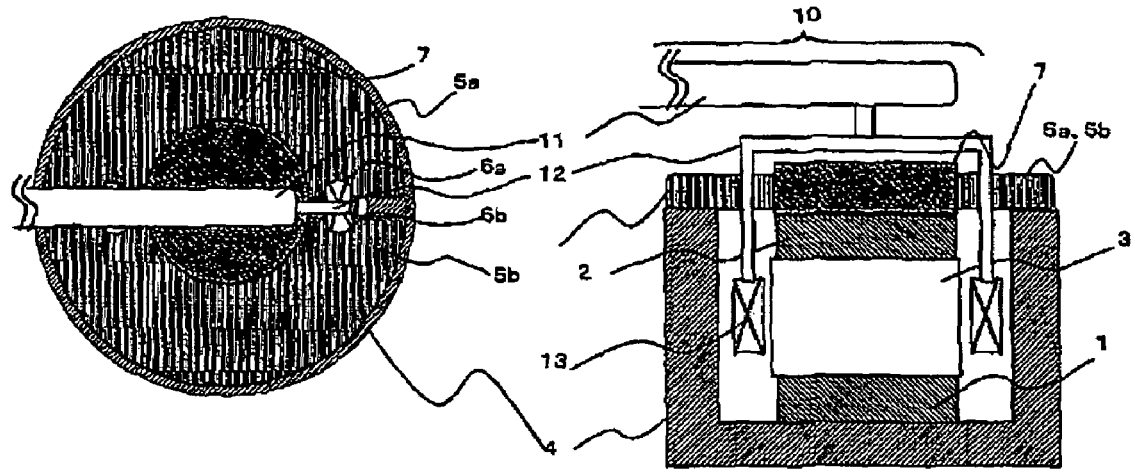
Fig. 3(a)        Fig. 3(b)
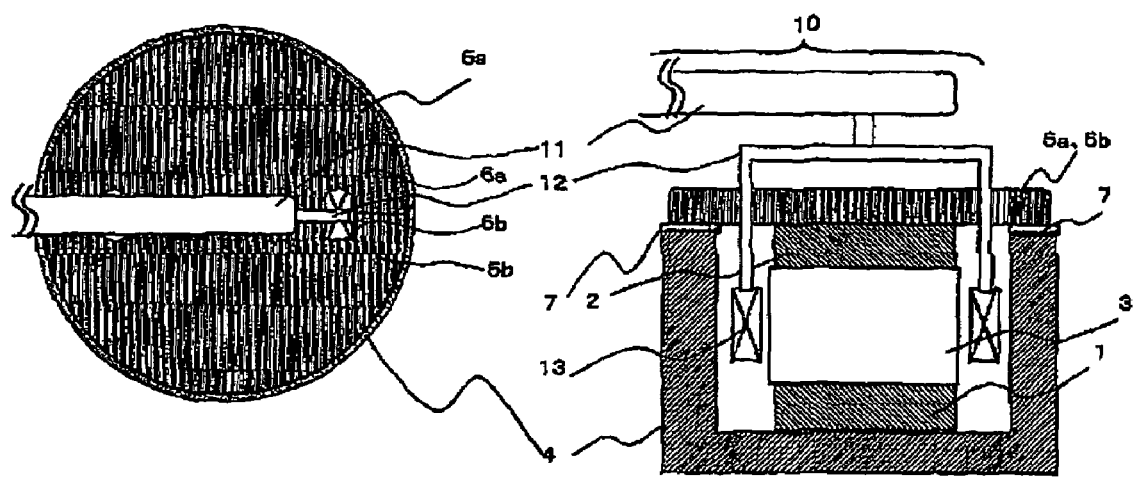
Fig. 4(a)        Fig. 4(b)

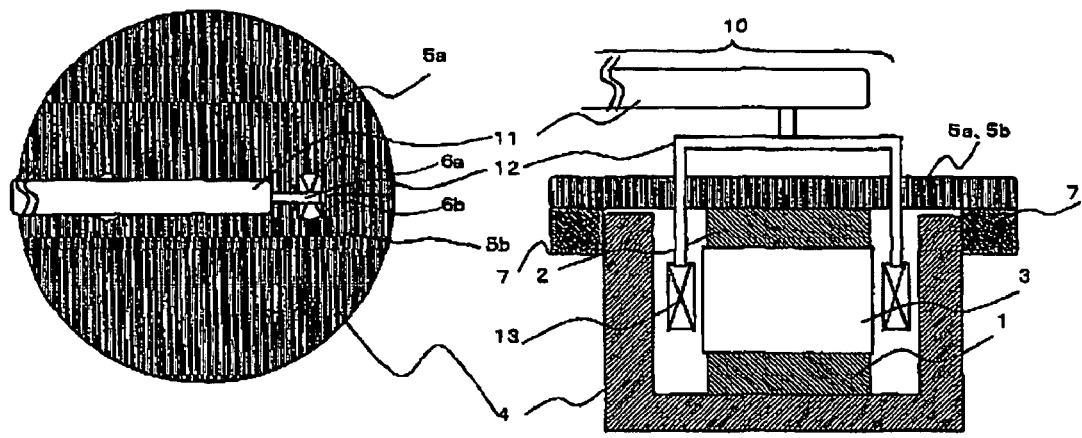
Fig. 5(a)  Fig. 5(b)
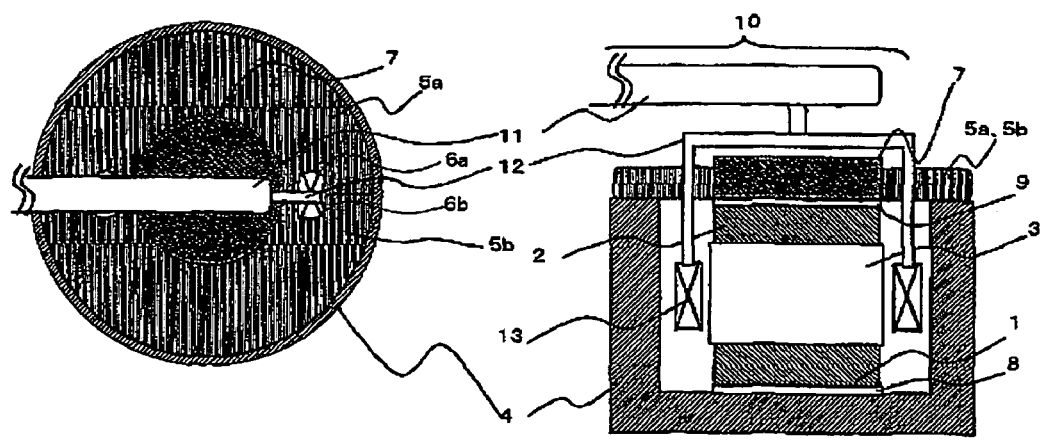
Fig. 6(a)  Fig. 6(b)

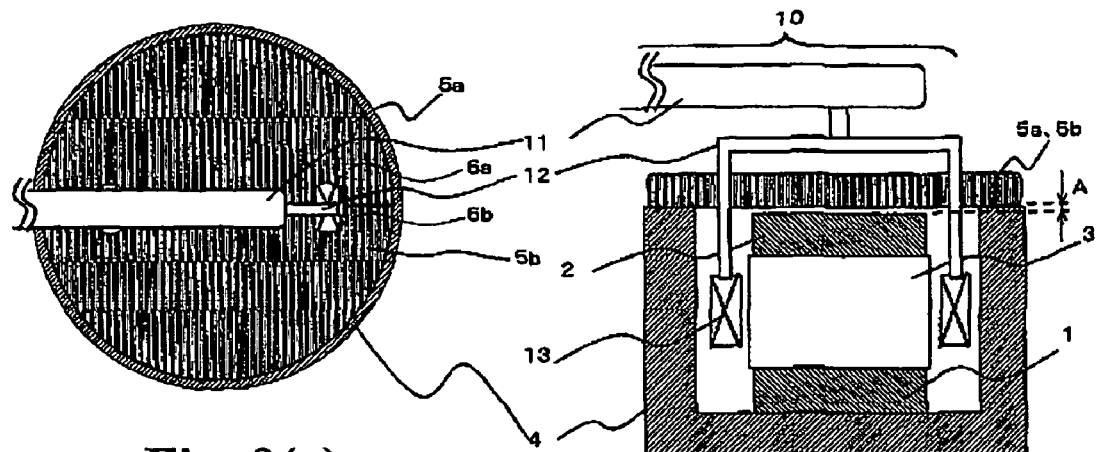
Fig. 9(a) Fig. 9(b)
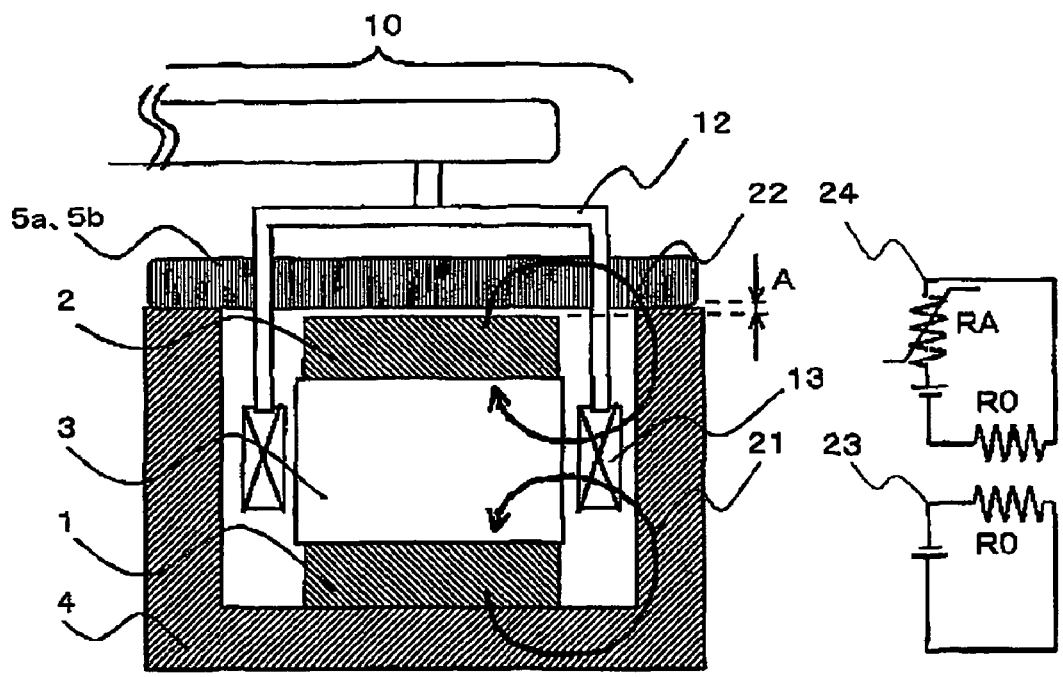
Fig. 10(a) Fig. 10(b)

ELECTROMAGNETIC-FORCE-BALANCING-TYPE ELECTRONIC BALANCE

TECHNICAL FIELD

The present invention relates to a magnetic circuit suitably usable in an electromagnetic-force-balancing-type electronic balance.

BACKGROUND ART

As shown in FIG. 9, a magnetic circuit incorporated in a conventional electromagnetic-force-balancing-type (or electromagnetic-force-compensation-type) electronic balance comprises first and second permanent magnets 1, 2 disposed such that their magnetic poles of the same polarity are opposed to one another, a pole piece 3 sandwiched between the first and second permanent magnets 1, 2, a tubular-shaped yoke 4 having an opening only on one side thereof and an inner surface in contact with the first permanent magnet 1, and a pair of covers 5a, 5b in contact with or adjacent to the second permanent magnet 2 (see, for example, the following Patent Publication 1). The electromagnetic-force-balancing-type electronic balance has a movable assembly 10 which comprises a movable lever 11, a force-coil mounting plate 12 fixed to one end of the movable-section lever 11, and a force coil 13 fixedly mounted to the force-coil mounting plate 12. The electronic balance also has a weighting pan (not shown) fixed to the other end of the movable-section lever 11. The electronic balance is designed to control a current to be applied to the force coil 13 so as to allow the force coil 13 to be kept at a position approximately concentric to the pole piece 3, and subject a current value detected from the force coil 13 to various corrections so as to calculate a weight of an object placed on the weighting pan.

In a design stage of the magnetic circuit, with a view to reliably fastening between the cover pair 5a, 5b and the yoke 4 through screwing or the like, regardless of machining tolerances and assembling errors in the components, an air gap A has been set between the cover pair 5a, 5b and the second permanent magnet 2, as a margin of error (see, for example, the paragraph [0024] of the Patent Publication 1).

[Parent Publication 1] Japanese Patent No. 3691607

The air gap A is likely to be entirely or partly left only on the side of the second permanent magnet 2 after assembling of the magnetic circuit. The remaining air gap creates a magnetic resistance in the magnetic circuit to cause a problem, such as hysteresis. This problem will be specifically described with reference to FIG. 10, wherein FIG. 10(a) is a sectional side view showing the magnetic circuit incorporated in the conventional electromagnetic-force-balancing-type electronic balance, and FIG. 10(b) is an equivalent magnetic circuit thereof. As shown in FIG. 10(a), there are two magnetic sub-circuits: a first magnetic sub-circuit 21 extending from one of the magnetic poles of the first permanent magnet 1 to the other magnetic pole of the first permanent magnet 1 through the yoke 4 and a space between the yoke 4 and the pole piece 3; and a second magnetic sub-circuit 22 extending from one of the magnetic poles of the second permanent magnet 1 to the other magnetic pole of the second permanent magnet 2 through the cover pair 5a, 5b, the yoke 4 and the space between the yoke 4 and the pole piece 3.

Respective equivalent magnetic sub-circuits 23, 24 of the first and second sub-circuits 21, 22 are shown in FIG. 10(b). If a certain air gap exists between the cover pair 5a, 5b and the second permanent magnet 2 in the second magnetic sub-circuit 22, a magnetic resistance RA proportional to the air gap will be created in the second permanent magnet 2 to cause an imbalance between the first and second magnetic sub-circuits 21, 22. As to this problem, the inventors found that the influence of hysteresis on change in current flowing through the force coil 13 becomes more prominent as a current to be applied to the force coil is increased or as a required torque for the movable assembly 10 is increased, as described in more detail below.

In response to a magnetic field externally applied to a ferromagnetic material, such as iron, magnetic domain walls are moved to produce magnetization in a direction of the applied magnetic field, and the number of magnetic domains oriented in the magnetic field direction is increased to generate magnetization. Then, when the magnetic field intensity is further increased, the entire crystal structure of the material has only magnetic domains oriented in the magnetic field direction, and the magnetization reaches saturation. In this process, when the ferromagnetic material is a high-purity metal, the magnetic domain wall movement can be induced easily, or the magnetization reaches saturation only by a low intensity of magnet field. In contrast, if the ferromagnetic material contains impurities, the magnetic domain wall movement is hindered, and a higher intensity of magnetic field is required to allow the magnetization to reach saturation. Moreover, even after the external magnetic field is eliminated, the magnetization intensity will not return to zero to cause a remanent magnetization. As with the ferromagnetic material containing impurities, a remanent magnetization is caused by the air gap A existing in the magnetic circuit. The yoke 4 or the cover pair 5a, 5b is magnetized by the second permanent magnet 2. Further, during the course of magnetization based on a magnetic field generated by the force coil 13 applied with a current, when the applied current is relatively low, a resulting magnetization intensity is limited to a small ratio relative to the magnetization intensity based on the permanent magnet, or to a small value relative to the saturation magnetization, and therefore the intensity of a resulting remanent magnetization will have a negligible small impact. In contrast, if a current is applied to the force coil 13 at a value allowing a magnetization intensity to reach saturation, a resulting remanent magnetization or hysteresis will have a non-negligible impact.

DISCLOSURE OF THE INVENTION

In view of the above problem, it is an object of the present invention to provide an electromagnetic-force-balancing-type electronic balance capable of suppressing adverse influences of a magnetic resistance caused by an air gap existing in a magnetic circuit.

It is another object of the present invention to provide an electromagnetic-force-balancing-type electronic balance capable of counteracting an imbalance in hysteresis characteristic.

It is another object of the present invention to provide an electromagnetic-force-balancing-type electronic balance capable of facilitating assembling operations thereof.

In order to achieve the above objects, the present invention has the following features. The first aspect of the invention provides an electromagnetic-force-balancing-type electronic balance having a magnetic circuit which includes a plurality of components consisting of a tubular-shaped yoke having an opening only on one side thereof, a first permanent magnet, a pole piece; a second permanent magnet, and a cover. In this magnetic circuit, the yoke is disposed to orient the opening in an upward direction. The first permanent magnet, the pole piece and the second permanent magnet are housed in an internal space of the yoke in this order along the upward direction, while allowing the first and second permanent magnets to be disposed such that their magnetic poles of the same polarity are opposed to one another. Further, the cover is disposed above the yoke. The electronic balance is characterized by comprising a magnetic connection member mechanically connecting between two selected from the components.

The electronic balance, according to the first aspect of the invention, has a particular function based on the above feature. Specifically, the connection member allows the two components having a gap therebetween to be connected to one another mechanically and magnetically therethrough. Thus, a magnetic resistance due to the gap included in the magnetic circuit can be eliminated.

According to the second aspect of the invention, in the electronic balance as in the first aspect of the invention, the connection member mechanically connects the second permanent magnet and the cover.

The electronic balance, according to the second aspect of the invention, has a particular function based on the above feature. Specifically, the connection member allows the second permanent magnet and the cover to be connected to one another mechanically and magnetically therethrough. In this case, the cover and the yoke are in contact with one another to allow the second permanent magnet and the yoke to be magnetically coupled to one another through the connection member and the cover, and the second permanent magnet and the pole piece are in contact with one another, so as to form a second magnetic sub-circuit extending from one of the magnetic poles of the second permanent magnet to the other magnetic pole of the second permanent magnet through the connection member, the cover, the yoke, a space between the yoke and the pole piece, and the pole piece. Further, the yoke and the first permanent magnet are in contact with one another so as to form a first magnetic sub-circuit extending from one of the magnetic poles of the first permanent magnet to the other magnetic pole of the first permanent magnet through the yoke, the space between the yoke and the pole piece, and the pole piece. Thus, a magnetic resistance due to the gap included in the first or second magnetic sub-circuits can be eliminated.

According to the third aspect of the invention, in the electronic balance as in the second aspect of the invention, the cover is formed with a through-hole, and the connection member is disposed to protrude upward from a top surface of the cover through the through-hole.

The electronic balance, as in the third aspect of the invention, has a particular function based on the above feature. Specifically, the connection member disposed to protrude upward from the top surface of the cover through the through-hole formed in the cover can be fixed while being kept in contact with a wall surface defining the through-hole.

According to the fourth aspect of the invention, in the electronic balance as in the first aspect of the invention, the connection member mechanically connects the yoke and the cover.

The electronic balance, as in the fourth aspect of the invention, has a particular function based on the above feature. Specifically, the connection member allows the yoke and the cover to be connected to one another mechanically and magnetically therethrough. In this case, a second magnetic sub-circuit is formed to extend from one of the magnetic poles of the second permanent magnet to the other magnetic pole of the second permanent magnet through the cover, the connection member, the yoke, a space between the yoke and the pole piece, and the pole piece. Further, a first magnetic sub-circuit is formed to extend from one of the magnetic poles of the first permanent magnet to the other magnetic pole of the first permanent magnet through the yoke, the space between the yoke and the pole piece, and the pole piece.

According to the fifth aspect of the invention, in the electronic balance as in the fourth aspect of the invention, the connection member mechanically connects the cover and an outer periphery of the yoke.

The electronic balance, as in the fifth aspect of the invention, has a particular function based on the above feature. Specifically, the connection member allows the cover and the outer periphery of the yoke to be connected to one another mechanically and magnetically therethrough.

According to the sixth aspect of the invention, the present invention also provides an electromagnetic-force-balancing-type electronic balance having a magnetic circuit which includes a plurality of components consisting of a tubular-shaped yoke having an opening only on one side thereof, a first permanent magnet, a pole piece, a second permanent magnet, and a cover. In this magnetic circuit, the yoke is disposed to orient the opening in an upward direction. The first permanent magnet, the pole piece and the second permanent magnet are housed in an internal space of the yoke in this order along the upward direction, while allowing the first and second permanent magnets to be disposed such that their magnetic poles of the same polarity are opposed to one another. Further, the cover is disposed above the yoke. The electronic balance is characterized by comprising a gap-defining member disposed between two selected from the components, so as to reduce a difference in magnetic resistance between a first magnetic sub-circuit formed of the first permanent magnet, the yoke and the pole piece, and a second magnetic sub-circuit formed of the second permanent magnet, the cover, the yoke and the pole piece.

The electronic balance, as in the sixth aspect of the invention, has a particular function based on the above feature. Specifically, the two components are mechanically connected to one another through the gap-defining member disposed therebetween with a given magnetic resistance of the gap-defining member. Thus, a difference between respective magnetic resistances included in the first and second magnetic sub-circuits can be effectively reduced.

According to the seventh aspect of the invention, in the electronic balance as in the sixth aspect of the invention, the gap-defining member includes a first gap-defining member disposed between the first permanent magnet and the yoke, and a second gap-defining member disposed between the second permanent magnet and the cover.

The electronic balance, as in the seventh aspect of the invention, has a particular function based on the above feature. Specifically, in the case where the second permanent magnet and the cover are connected to one another through the second gap-defining member disposed therebetween with a given magnetic resistance of the second gap-defining member, and the cover and the yoke being in contact with one another, the second permanent magnet and the cover can be magnetically coupled to one another through the second gap-defining member and the cover, with a predetermined magnetic resistance. Further, the first permanent magnet and the yoke can be mechanically connected to one another through the first gap-defining member disposed therebetween with a given magnetic resistance of the first gap-defining member. In this case, a second magnetic sub-circuit is formed to extend from one of the magnetic poles of the second permanent magnet to the other magnetic pole of the second permanent magnet through the second gap-defining member, the cover, the yoke, a space between the yoke and the pole piece, and the pole piece. Further, a first magnetic sub-circuit is formed to extend from one of the magnetic poles of the first permanent magnet to the other magnetic pole of the first permanent magnet through the first gap-defining member, the yoke, the space between the yoke and the pole piece, and the pole piece.

As above, the first aspect of the invention has the aforementioned function. Thus, a magnetic resistance due to the gap included in the magnetic circuit can be eliminated to achieve an effect of being able to reduce the influence of hysteresis.

The second aspect of the invention has the aforementioned function. Thus, the connection member can be simply inserted between the second permanent magnet and the cover to obtain the effect of the first aspect of the invention. After the first permanent magnet, the pole piece and the second permanent magnet are fixedly housed in the internal space of the yoke, and a force coil is inserted into the internal space of the yoke, the cover may be fixedly attached to the yoke while interposing the connection member therebetween to achieve an effect of being able to readily perform an adjustment for eliminating a gap.

The third aspect of the invention has the aforementioned function. Thus, in addition to the effect of the first aspect of the invention, the connection member disposed to protrude upward from the top surface of the cover and fixed while being kept in contact with the wall surface defining the through-hole can achieve an effect of being able to provide an electromagnetic-force-balancing-type electronic balance having enhanced adjustability and high process yield.

The fourth aspect of the invention has the aforementioned function. Thus, the same function as those in the invention as in the second aspect of the invention can be achieved.

The fifth aspect of the invention has the aforementioned function. For example, the yoke may be formed to have a height allowing the second permanent magnet to reliably protrude from the yoke, and the connection member may be formed to have a height coming into contract with an outer peripheral surface. Thus, in addition to the effects obtained by the invention as in the fourth aspect of the invention, the fifth aspect of the invention can achieve an effect of being able to provide an electromagnetic-force-balancing-type electronic balance having enhanced adjustability and high process yield.

The sixth aspect of the invention has the aforementioned function. Thus, a thickness and/or material of the gap-defining member disposed in the magnetic circuit can be appropriately selected to achieve an effect of being able to desirably adjust hysteresis characteristics in the magnetic circuit.

The seventh aspect of the invention has the aforementioned function. Thus, the magnetic resistances of the first and second gap-defining members in the magnetic circuit are inserted relative, respectively, to the first and second permanent magnets to achieve an effect of being able to counteract an imbalance in hysteresis characteristic.

BRIEF DESCRIPTION OF THE DRAWINGS

FIG. 1 is a fragmentary diagram showing the structure of an electromagnetic-force-balancing-type electronic balance according to a first embodiment of the present invention, wherein

FIG. 2 is an explanatory diagram showing an equivalent magnetic circuit relating to electromagnetic-force-balancing-type electronic balances according to first to fourth embodiments of the present invention, wherein

FIG. 3 is a fragmentary diagram showing the structure of an electromagnetic-force-balancing-type electronic balance according to a second embodiment of the present invention, wherein FIG. 3(a) is a top view of the electronic balance, and FIG. 3(b) is a sectional side view of the electronic balance.

FIG. 4 is a fragmentary diagram showing the structure of an electromagnetic-force-balancing-type electronic balance according to a third embodiment of the present invention, wherein FIG. 4(a) is a top view of the electronic balance, and FIG. 4(b) is a sectional side view of the electronic balance.

FIG. 5 is a fragmentary diagram showing the structure of an electromagnetic-force-balancing-type electronic balance according to a fourth embodiment of the present invention, wherein FIG. 5(a) is a top view of the electronic balance, and FIG. 5(b) is a sectional side view of the electronic balance.

FIG. 6 is a fragmentary diagram showing the structure of an electromagnetic-force-balancing-type electronic balance according to a fifth embodiment of the present invention, wherein FIG. 6(a) is a top view of the electronic balance, and FIG. 6(b) is a sectional side view of the electronic balance.

FIG. 7 is an explanatory diagram showing an equivalent magnetic circuit relating to electromagnetic-force-balancing-type electronic balances according to fifth and sixth embodiments of the present invention, wherein

FIG. 8 is a fragmentary diagram showing the structure of an electromagnetic-force-balancing-type electronic balance according to a sixth embodiment of the present invention, wherein

FIG. 9 is fragmentary diagram showing the structure of a conventional electromagnetic-force-balancing-type electronic balance, wherein FIG. 9(a) is a top view of the conventional electronic balance, and FIG. 9(b) is a sectional side view of the conventional electronic balance.

FIG. 10 is an explanatory diagram showing an equivalent magnetic circuit relating to the conventional electromagnetic-force-balancing-type electronic balance, wherein FIG. 10(a) is a sectional side view of the conventional electronic balance, and FIG. 10(b) is an equivalent circuit diagram of a magnetic circuit of the conventional electronic balance.

BEST MODE FOR CARRYING OUT THE INVENTION

First Embodiment

Figures 1A, 1B:
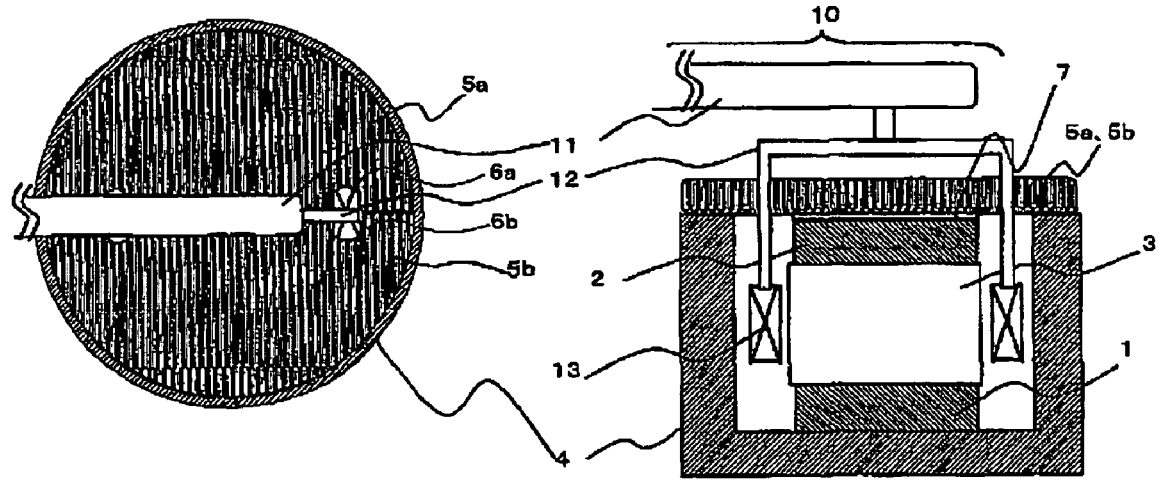
FIG. 1(a) is a top view of the electronic balance.
FIG. 1(b) is a sectional side view of the electronic balance.

As shown in FIG. 1, a magnetic circuit for an electromagnetic-force-balancing-type (or electromagnetic-forcecompensation-type) electronic balance according to a first embodiment of the present invention comprises first and second permanent magnets 1, 2 disposed such that their north (N) poles are opposed to one another, a pole piece 3 sandwiched between the first and second permanent magnets 1, 2, a tubular-shaped yoke 4 having an opening only on one side thereof and an inner surface in contact with the first permanent magnet 1, a pair of covers 5a, 5b in contact with or adjacent to the second permanent magnet 2, and a connection member 7 disposed between the second permanent magnet 2 and the cover pair 5a, 5b. The electronic balance has a movable assembly 10 which comprises a movable lever 11, a force-coil mounting plate 12 fixed to one end of the movable-section lever 11, and a force coil 13 fixedly mounted to the force-coil mounting plate 12. The electronic balance also has a weighting pan (not shown) fixed to the other end of the movable-section lever 11. The connection member is made of a magnetic material. While the connection member 7 is preferably made of the same magnetic material as that of the cover pair 5a, 5b and the yoke 4, the material of the connection member 7 is not necessarily identical to the material of the cover pair 5a, 5b and the yoke 4, but may be any other suitable magnetic material. Further, the first and second permanent magnets 1, 2 are not necessarily disposed such that their N poles are opposed to one another, but may be disposed such that their south (S) poles are opposed to one another. In either case, a polar direction should be appropriately set depending on a control circuit of the force coil 13 and other factor, because a direction of a torque to be produced in the force coil 13 is determined by the polar direction and a direction of a current to be applied to the force coil 13. This electromagnetic-force-balancing-type electronic balance is assembled according to the following process.

(Assembling Step 1)

Firstly, the first permanent magnet 1 is adhesively attached onto a central region of an inner surface of a bottom wall of the yoke 4. Then, the pole piece 3 is adhesively attached onto a top surface of the first permanent magnet 3. In this embodiment, each of the yoke 4 and the pole piece 3 is made of a ferromagnetic material, such as soft iron, and thereby magnetically attracted to the first permanent magnet 1. Thus, each of the yoke 4 and the pole piece 3 can be adequately positioned only by an extremely low adhesive force. Then, the second permanent magnet 2 is adhesively attached onto a top surface of the pole piece 3 while orienting the second permanent magnet 2 relative to the first permanent magnet 1 such that their poles of the same polarity are opposed to one another. When the pole piece 3 has a thickness enough to avoid magnetic saturation, the first and second permanent magnets 1, 2 are strongly attached to the pole piece 3 based on a magnetic force even through their poles of the same polarity are opposed to one another. Thus, the second permanent magnet 2 can be adequately positioned only by an extremely low adhesive force. In this step, the first permanent magnet 1, the second permanent magnet 2 and the pole piece 3 should be disposed such that their vertical axes are aligned with a vertical axis of the yoke 4, to prevent a magnet field from being inhomogeneously formed in the internal space of the yoke. Further, a special jig should be prepared to prevent the first permanent magnet 1, the second permanent magnet 2 and the pole piece 3 from being magnetically attached onto an inner surface of a side wall of the yoke 4. For example, the above attaching operations may be performed while inserting the jig through a through-hole formed in respective centers of the first permanent magnet 1, the second permanent magnet 2, the pole piece 3 and the bottom wall of the yoke 4.

(Assembling Step 2)

Plural number of the connection members 7 different in thickness are prepared in advance. A specific one of the connection members 7 which has a thickness allowing a height of the specific connection member 7 when placed on a top surface of the second permanent magnet 7 to become equal to that of an upper edge of the yoke 4 is selected, and adhesively attached onto the top surface of the second permanent magnet 7. The above assembling steps 1 and 2 may be performed for the magnetic circuit independently.

(Assembling Step 3)

Then, the assembled magnetic circuit is incorporated into a body of the electromagnetic-force-balancing-type electronic balance, and a position of the magnetic circuit is finely adjusted to allow the force coil 13 to be adequately located in a space between the pole piece 3 and the yoke 4.

(Assembling Step 4)

Lastly, the cover pair 5a, 5b is fixedly attached onto a top surface of the connection member 7, for example, by fastening the cover pair 5a, 5b to the upper edge of the yoke 4 using screws. In this step, the force-coil mounting plate 12 should be inserted through two notches 6a, 6b formed in each of the cover 5a and the cover 5b while paying attention to preventing the force-coil mounting plate 12 from coming into contact with the cover pair 5a, 5b.

Second Embodiment

As shown in FIG. 3, except that the cover pair 5a, 5b is formed with a cutout for the connection member 7, and the connection member 7 is disposed to protrude upward from a top surface of the cover pair 5a, 5b through the cutout, an electromagnetic-force-balancing-type electronic balance according to a second embodiment of the present invention has the same structure as that in the first embodiment. This electronic balance is assembled according to the following process (Assembling steps 1 and 3 are the same as those in the first embodiment, and their descriptions will be omitted.).

(Assembling Step 2)

A specific one of the connection members 7 which has a thickness allowing the second permanent magnet 2 to adequately protrude upward from the top surface of the cover pair 5a, 5b is adhesively attached onto the top surface of the second permanent magnet 2. The above assembling steps 1 and 2 may be performed for the magnetic circuit independently.

(Assembling Step 3)

The cover 5a and the cover 5b are formed, respectively, with two cutout portions which form a through-hole in a state after the cover 5a and the cover 5b are combined together as the cover pair. The cover pair 5a, 5b is fixedly attached to the upper edge of the yoke 4, for example, through screwing, while clamping the connection member 7 between the cutout portions. Preferably, the cutout of the cover pair 5a, 5b is formed to have a curvature accurately conforming to that of an outer periphery of the connection member 7. However, after combined, the cover 5a and the cover 5b are not necessarily in contact with one another. Thus, the cutout of the cover pair 5a, 5b may be formed to have a curvature slightly greater than that of the outer periphery of the connection member 7 to an extent that allows the cover pair 5a, 5b and the outer periphery of the connection member 7 to have a contact area enough to suppress the influence of hysteresis due to a magnetic resistance of the contact region therebetween, at a negligible level in view of the entire magnetic circuit, and each of the cover 5a and the cover 5b may be formed in a relatively small size to prevent the cover 5a and the cover 5b from coming into contact with one another. While a cover in this embodiment is divided into the cover 5a and the cover 5b, it may be a single-piece cover without dividing. In this case, a through-hole may be formed directly in the single-piece cover instead of the cutout portions. Further, the through-hole and the outer periphery of the connection member 7 may be machined to allow these to be fitted to one another. This machining can be performed with a small variation or error as compared with a sum of tolerances of the components, to achieve a required accuracy relatively easily. If the through-hole formed in the cover has an area greater than that of a sectional area of the connection member 7, the cover may be fixed while displacing the center of the through-hole from that of the connection member 7, so as to allow a part of a wall surface defining the through-hole to come into contact with the outer periphery of the connection member 7.

Third Embodiment

As shown in FIG. 4, except that the yoke 4 is formed to have a height less than that of the second permanent magnet after assembling, and the connection member 7 is formed in a ring shape and sandwiched between the cover pair 5a, 5b and the yoke 4, an electromagnetic-force-balancing-type electronic balance according to a third embodiment of the present invention has the same structure as that in the first embodiment. This electronic balance is assembled according to the following process (Assembling steps 1, 3 and 4 are the same as those in the first embodiment, and their descriptions will be omitted.).

(Assembling Step 2)

Plural number of the connection members 7 different in thickness are prepared in advance. A specific one of the connection members 7 which has a thickness allowing a height of the specific connection member 7 when placed on the upper edge of the yoke 4 to become equal to that of the second permanent magnet 7 is selected, and adhesively attached onto the upper edge of the yoke 4.

Fourth Embodiment

As shown in FIG. 5, except that the yoke 4 is formed to have a height less than that of the second permanent magnet after assembling, and the connection member 7 is formed as a pair of half-ring-shaped connection members which are fixedly attached, respectively, onto the cover 5a and the cover 5b in such a manner that respective inner peripheries of the half-ring-shaped connection members 7 come into contact with an outer periphery of the yoke 4, an electromagnetic-force-balancing-type electronic balance according to a fourth embodiment of the present invention has the same structure as that in the third embodiment. This electronic balance is assembled according to the following process (Assembling steps 1 and 3 are the same as those in the first embodiment, and their descriptions will be omitted.).

(Assembling Step 2)

The half-ring-shaped connection members 7 are adhesively attached, respectively, onto the cover 5a and the cover 5b. Each of the half-ring-shaped connection members 7 is formed to have a thickness (height) allowing a contact between the respective inner peripheries of the connection members 7 and the outer periphery of the yoke 4 to be reliably ensured even if a difference between respective heights of the yoke 4 and the second permanent magnet 2 is varied.

(Assembling Step 4)

After the cover 5a and the cover 5b are disposed at a height allowing the cover 5a and the cover 5b to come into contact with the top surface of the second permanent magnet 2, the outer periphery of the yoke 4 and the connection members 7 are fixedly fastened, for example, through screwing. In this step, each of the inner peripheries of the connection members 7 is preferably formed to have a curvature completely identical to that of an outer periphery of the yoke 4. However, after combined, the cover 5a and the cover 5b are not necessarily in contact with one another. Thus, each of the inner peripheries of the connection members 7 may be formed to have a curvature slightly greater than that of the outer periphery of the yoke 4 to an extent that allows each of the inner peripheries of the connection members 7 and the outer periphery of the yoke 4 to have a contact area enough to suppress the influence of hysteresis due to a magnetic resistance of the contact region therebetween, at a negligible level in view of the entire magnetic circuit, and each of the cover 5a and the cover 5b may be formed in a relatively small size to prevent the cover 5a and the cover 5b from coming into contact with one another.

Figures 2A, 2B:
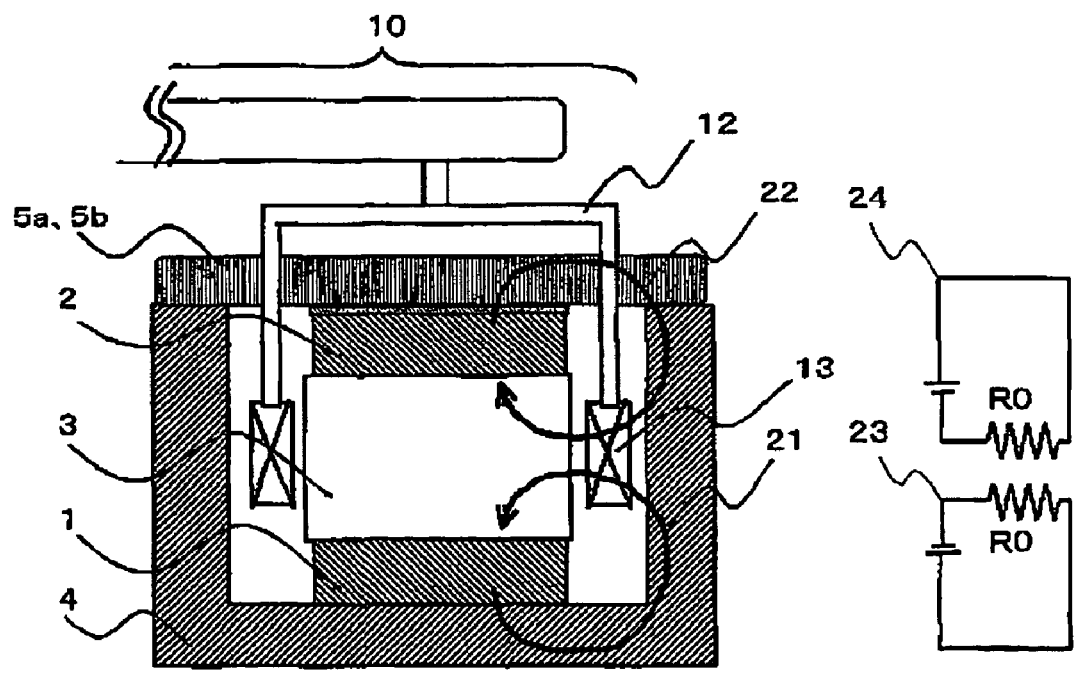
FIG. 2(a) is a sectional side view of one of the electronic balances.
FIG. 2(b) is an equivalent circuit diagram of a magnetic circuit of the electronic balance.

Each of the electromagnetic-force-balancing-type electronic balances according to the first to fourth embodiments operates as follows. When an object is placed on the weighting pan, the movable lever 11 is inclined to vertically move the force coil 13. Thus, a current is applied to the force coil 13 to hinder the movement. As shown in FIG. 2, in response to the current applied to the force coil 13, a vertical torque is produced in the force coil 13 based on an interaction between a first magnetic sub-circuit 21 formed of the first permanent magnet 1, the yoke 4, the pole piece 3 and a space between the pole piece 3 and the yoke 4, and a second magnetic sub-circuit 22 formed of the second permanent magnet 2, the connection member 7, the cover pair 5a, 5b, the yoke 4, the pole piece 3 and the space between the pole piece 3 and the yoke 4. In this process, the vertical torque of the force coil 13 is produced approximately in proportion to the current applied to the force coil 13. Thus, a weight of the object counterbalancing the vertical torque produced in the force coil 13 can be calculated from a value of the current. As seen in FIG. 2, an equivalent magnetic sub-circuit 23 of the magnetic circuit according to the above embodiments does not include the magnetic resistance RA due to the air gap A as in the equivalent magnetic sub-circuit 23 of the conventional magnetic circuit illustrated in FIG. 10. Thus, during weighting, a hysteresis phenomenon due to the gap A can be suppressed. Generally, it is generally difficult to use a special tool after insertion of the force coil 13 due to obstructions, such as frames, the movable lever 11 and other components of the electronic balance. In the above embodiments, an adjustment as measures against the air gap A can be performed before insertion of the force coil 13. Further, after the force coil 13 is inserted into the interior space of the yoke 4, the assembling process can be completed only by fixing the cover pair 5a, 5b, for example, through screwing. This makes it possible to facilitate the assembling operations.

Fifth Embodiment

As shown in FIG. 6, a magnetic circuit for an electromagnetic-force-balancing-type electronic balance according to a fifth embodiment of the present invention comprises first and second permanent magnets 1, 2 disposed such that their poles of the same polarity are opposed to one another, a pole piece 3 sandwiched between the first and second permanent magnets 1, 2, a first gap-defining member in contact with the first permanent magnet 1, a second gap-defining member in contact with the second permanent magnet 2, a tubular-shaped yoke 4 having an opening only on one side thereof and an inner surface in contact with the first gap-defining member 8, and a pair of covers 5a, 5b in contact with the second gap-defining member 9. The electronic balance has a movable assembly 10 having the same structure as that in the first embodiment. Each of the first and second gap-defining members is made of a non-magnetic material. This electromagnetic-force-balancing-type electronic balance is assembled according to the following process.

Figures 7A, 7B:
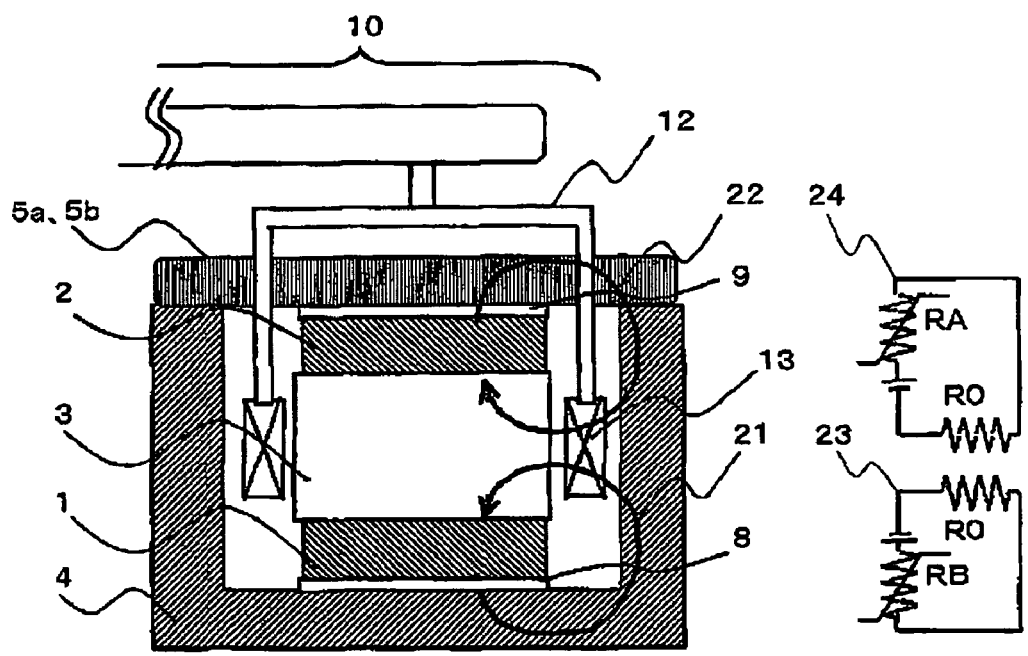
FIG. 7(a) is a sectional side view of one of the electronic balances.
FIG. 7(b) is an equivalent circuit diagram of a magnetic circuit of the electronic balance.

The first gap-defining member 8 is placed on an inner surface of a bottom wall of the yoke 4. Then, on a top surface of the first gap-defining member 8 the first permanent magnet 1, the pole piece 3 and the second permanent magnet 2 are adhesively attached in this order in the same manner as the assembling step 1 in the first embodiment. Further, the second gap-defining member 9 is adhesively attached onto a top surface of the second permanent magnet 2. The subsequent operations for assembling the cover 5a, the cover 5b and the movable assembly 10 are the same as those in the first embodiment. In this step, plural number of the first gap-defining members 8 different in thickness and plural number of the second gap-defining members 9 different in thickness are prepared in advance. A specific one of the first gap-defining members 8 and a specific one of the second gap-defining members 9 which allow a height of the specific second gap-defining members 9 when placed on the second permanent magnet 2 to become equal to that of an upper edge of the yoke are selected and used. Preferably, the first gap-defining member 8 has a thickness approximately equal to that of the second gap-defining members 9. However, as long as a difference between respective hysteresis characteristics of magnetic resistances RA, RB illustrated FIG. 7 is negligibly small in view of the entire hysteresis characteristic, the thicknesses of the first and second gap-defining member 8 may be different from one another. This magnetic circuit makes it possible to reduce a difference between the respective magnetic resistances includes in a first magnetic sub-circuit 21 and a second magnetic sub-circuit 22 so as to counteract an imbalance in hysteresis characteristic.

Sixth Embodiment

Figures 8A, 8B:
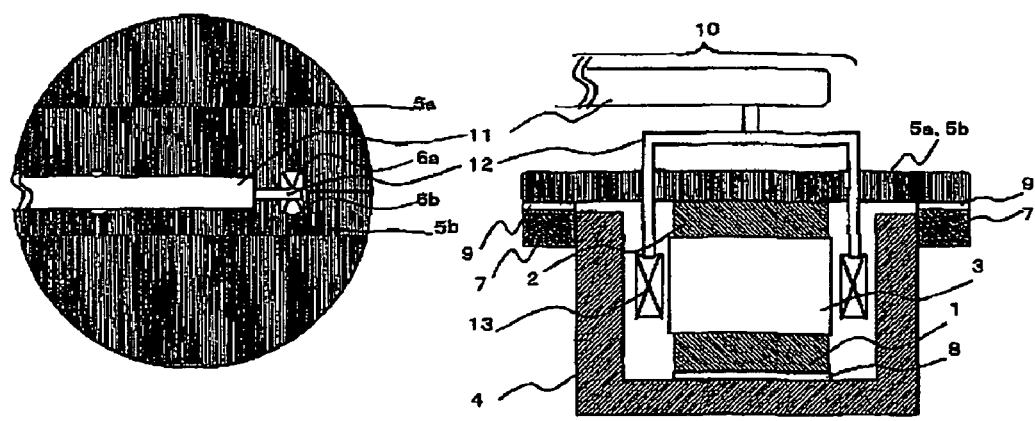
FIG. 8(a) is a top view of the electronic balance.
FIG. 8(b) is a sectional side view of the electronic balance.

As shown in FIG. 8, except that the second gap-defining member 9 is formed as a pair of half-ring-shaped gap-defining members which are fixedly attached, respectively, onto the cover 5a and the cover 5b, and a pair of half-ring shaped magnetic connection members are fixedly attached, respectively, to the half-ring-shaped second gap-defining members 9, an electromagnetic-force-balancing-type electronic balance according to a sixth embodiment of the present invention has the same structure as that in the fifth embodiment. This electronic balance is assembled according to the following process.

The first gap-defining member 8 is placed on the inner surface of the bottom wall of the yoke 4. Then, on a top surface of the first gap-defining member 8 the first permanent magnet 1, the pole piece 3 and the second permanent magnet 2 are adhesively attached in this order in the same manner as the assembling step 1 in the first embodiment. Further, the half-ring-shaped second gap-defining members 9 are adhesively attached, respectively, onto bottom surfaces of the cover 5a and the cover 5b, and the half-ring shaped magnetic connection members are adhesively attached, respectively, onto bottom surfaces of the second gap-defining members 9. The subsequent operations for assembling the cover 5a, the cover 5b and the movable assembly 10 are the same as those in the fourth embodiment. In this embodiment, the first and second gap-defining members 8, 9 are different in shape from one another. Thus, respective thicknesses of the first and second gap-defining members 8, 9 are pre-set to allow their magnet resistances to become approximately equal to one another.

Each of the electromagnetic-force-balancing-type electronic balances according to the fifth and sixth embodiments operates in the same manner as the first to fourth embodiments. As seen in FIG. 7, an equivalent magnetic sub-circuit 23 of the magnetic circuit according to the fifth and sixth embodiments includes a magnetic resistance RA due to the second gap-defining member 8 as with the second equivalent magnetic sub-circuit 23 of the conventional magnetic circuit illustrated in FIG. 10. However, a magnetic resistance RB approximately equal to the magnetic resistance RA is created in a first equivalent magnetic sub-circuit 22 by the second gap-defining member to counteract an imbalance in hysteresis characteristic.

While the specific embodiments for suppressing the influence of hysteresis due to an air gap included in the magnetic circuit have been described, the present invention is not limited to the specific embodiments, but various modification and changes may be made therein, as long as the connection member is disposed between two components which is likely to have an air gap therebetween, or the gap-defining member is disposed to achieve matching between first and second magnetic sub-circuits.

Further, while the cover in the above embodiments is formed as a two-piece cover desirable in terms of assembling performance, the cover may be divided into three pieces or more, or may be formed as a single-piece cover without dividing.

What is claimed is:

1. An electromagnetic-force-balancing-type electronic balance having a magnetic circuit which includes a plurality of components consisting of: a tubular-shaped yoke having an opening only on one side thereof; a first permanent magnet; a pole piece; a second permanent magnet; and a cover, wherein: said yoke is disposed to orient said opening in an upward direction; said first permanent magnet, said pole piece and said second permanent magnet being housed in an internal space of said yoke in this order along said upward direction, while allowing said first and second permanent magnets to be disposed such that their magnetic poles of the same polarity are opposed to one another; and said cover being disposed above said yoke, said electronic balance being characterized by comprising a magnetic connection member mechanically connecting between two selected from said components.

2. The electronic balance as defined in claim 1, wherein said connection member mechanically connects said second permanent magnet and said cover.

3. The electronic balance as defined in claim 2, wherein said cover is formed with a through-hole, and said connection member is disposed to protrude upward from a top surface of said cover through said through-hole.

4. The electronic balance as defined in claim 1, wherein said connection member mechanically connects said yoke and said cover.

5. The electronic balance as defined in claim 4, wherein said connection member mechanically connects said cover and an outer periphery of said yoke.

6. An electromagnetic-force-balancing-type electronic balance having a magnetic circuit which includes a plurality of components consisting of: a tubular-shaped yoke having an opening only on one side thereof; a first permanent magnet; a pole piece; a second permanent magnet; and a cover, wherein: said yoke is disposed to orient said opening in an upward direction; said first permanent magnet, said pole piece and said second permanent magnet being housed in an internal space of said yoke in this order along said upward direction, while allowing said first and second permanent magnets to be disposed such that their magnetic poles of the same polarity are opposed to one another; and said cover being disposed above said yoke, said electronic balance being characterized by comprising a gap-defining member disposed between two selected from said components, so as to reduce a difference in magnetic resistance between a first magnetic sub-circuit formed of said first permanent magnet, said yoke and said pole piece, and a second magnetic sub-circuit formed of said second permanent magnet, said cover, said yoke and said pole piece.

7. The electronic balance as defined in claim 6, wherein said gap-defining member includes a first gap-defining member disposed between said first permanent magnet and said yoke, and a second gap-defining member disposed between said second permanent magnet and said cover.

* * * * *